United States Patent [19]

Gibbon

[11] Patent Number: 5,349,718
[45] Date of Patent: Sep. 27, 1994

[54] WIPER BLADE FOR A VEHICLE WINDSHIELD

[75] Inventor: Robert M. Gibbon, Fort Worth, Tex.

[73] Assignee: JMK International, Inc., Fort Worth, Tex.

[21] Appl. No.: 742,869

[22] Filed: Aug. 9, 1991

[51] Int. Cl.$^5$ .......................... B60S 1/38; B60S 1/04
[52] U.S. Cl. .......................... 15/250.36; 15/250.001; 15/245; 252/600; 252/408.1; 116/200; 116/206
[58] Field of Search ............... 116/200, 202, 206, 207; 15/245, 250.36, 250 R, 250.42, 250.41; 252/501.1, 582, 600, 408.1, 586, 588, 589; 106/493, 494–498

[56] References Cited

U.S. PATENT DOCUMENTS

| | | | |
|---|---|---|---|
| 2,971,209 | 2/1961 | Coulter | 15/250.40 |
| 3,336,135 | 8/1967 | Terashima et al. | 252/589 |
| 3,409,556 | 11/1968 | Bruner et al. | 252/600 |
| 4,028,118 | 6/1977 | Nakasuji et al. | 106/21 |
| 4,092,119 | 5/1978 | Baier et al. | 116/206 |
| 4,424,990 | 1/1984 | White et al. | |
| 4,425,161 | 1/1984 | Shibahashi et al. | 106/21 |
| 4,428,321 | 1/1984 | Arens | |
| 4,622,712 | 11/1986 | Sugita et al. | 15/250.36 |
| 4,737,463 | 4/1988 | Bhattacharjee et al. | 116/206 |
| 4,812,053 | 3/1989 | Bhattacharjee | 116/206 |
| 4,818,491 | 4/1989 | Fariss | |
| 4,987,849 | 1/1991 | Sherman | 116/200 |

Primary Examiner—David A. Scherbel
Assistant Examiner—Gary K. Graham
Attorney, Agent, or Firm—Jefferson Perkins

[57] ABSTRACT

An improved wiper blade of the type used on a vehicle windshield having an indicator means painted on the wiper blade which indicates that the wiper blade should be replaced. The exposure to UV light of the indicator painted on the wiper blade causes it to change in color and thus communicate to the user that it is time to change. The indicator paint is a silicone resin paint and would be applied to a wiper blade made of a resilient elastomeric material which is degraded with exposure to UV light in the atmosphere.

16 Claims, 1 Drawing Sheet

WIPER BLADE FOR A VEHICLE WINDSHIELD

BACKGROUND OF THE INVENTION

1. Field of the Invention

This invention relates to an indicator which is attached to a wiper blade of the type used on a vehicle windshield. The indicator is a paint having an active ingredient that causes the indicator to change in appearance when exposed to ultraviolet radiation. This change in appearance corresponds to the useful life of the wiper blade.

2. Description of the Prior Art

It is generally known to those skilled in the art that organic rubber tends to degrade when exposed to ultraviolet light. This is usually seen as hardening and cracking of the rubber. Most windshield wiper blades are made of this organic rubber, and with time, these wiper blades will lose their effectiveness.

Heretofore, unless the user of the wiper blade kept track of how long the blade had been in use, there was no way to determine when the wiper blade should be changed without a close inspection.

Because the deterioration of the wiper blade is a gradual process, a user would continue to use the wiper blade long past its optimum life. Vision during use would thus be obscured if the wiper blade had deteriorated past its effective life. Therefore it would be desirable to have an indicator which would alert the user when to replace the blade.

SUMMARY OF THE INVENTION

The present invention provides a simple method for determining when the useful life of the wiper blade is over. An indicator is painted on a visible portion of the wiper blade. Then the indicator changes appearance, the user will know that it is time to replace the wiper blade. This would be especially helpful where windshield wiper maintenance is critical such as on airplanes.

The present invention provides an elongate body, typically formed of an organic rubber, a silicone rubber or other resilient elastomeric material, with opposing longitudinal extending faces which terminate in opposing ends. The elongate body has a relatively thin longitudinally extending wiping edge.

An indicator means is located on at least one of the opposing longitudinal extending faces for irreversibly displaying visual evidence of exposure of the wiper blade to light rays in the atmosphere over time. This irreversible visual evidence provides an indication of the life expectancy of the wiper blade. The indicator means comprises one or more painted regions on the elongate body and preferably is a painted strip which is painted in a continuous line on at least one of the longitudinally extending faces of the elongate body. The strip is painted with a silicone resin paint which contains a pigment as an active component which is sensitive to ultraviolet radiation. After prolonged exposure, the active component undergoes an irreversible change in visible characteristic to alert the user that the wiper blade should be replaced.

The indicator means can also be applied in patterns other than in a continuous strip. It can be applied in non-continuous locations on at least one of the longitudinally extending faces of the elongate body. In one embodiment of the invention, the indicator means is applied to form a pattern of alphanumeric characters which form an intelligible message regarding the life expectancy of the wiper blade. Preferably, these alphanumeric characters would be initially unobservable and would be irreversibly displayed upon exposure of the wiper blade to light rays in the atmosphere.

Additional objects, features and advantages will be apparent in the written description which follows.

DETAILED DESCRIPTION OF THE INVENTION

Figure 1:
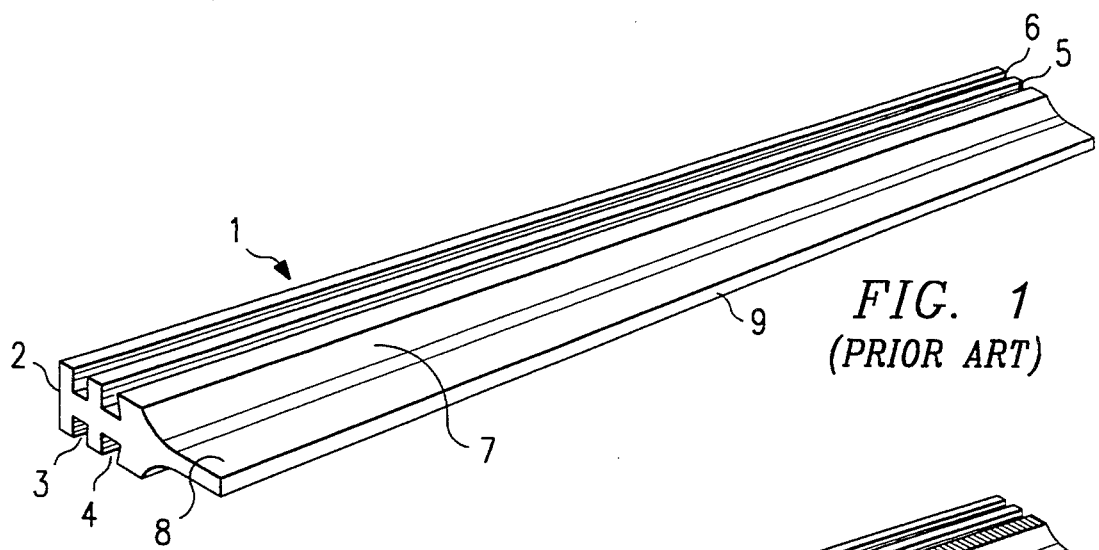
FIG. 1 is a perspective view of a prior art wiper blade element without any indicator means.

FIG. 1 is a perspective view of a prior art wiper blade element 1 without any indicator means. The wiper blade element 1 is made of resilient elastomeric material, usually either organic rubber or silicone rubber. The wiper blade 1 consists of a heavy base section 2 with longitudinally extending notches or grooves 3, 4, 5 and 6 opposing each other to facilitate attachment to a wiper carrier (not shown). The blade portion 7 extends outwardly from the base 2 and tapers inwardly therefrom at each side thereof to form a thin outer extent 8. The end of the blade 9 forms the wiping edge of the wiper blade.

The wiper blade is typically extruded in continuous fashion from an extruder and cut to a desired length. Extrusion processes of the type described are well known in the art and discussed, for example, in *Introduction To Plastics*, L. K. Arnold, Iowa State University Press, 1968, pages 46–49. Although any curable elastomer capable of being formed to the required shape can be used in the practice of the invention, silicone rubber compositions exhibit improved stability and weatherability characteristics. A typical composition of the type known in the art will contain about 100 parts silicone polarmet, about 40 parts filler, from about 0.5 to 2.0 parts vulcanizing catalyst, and 0 to 10 parts of other enhancement additives.

Typical silicone polymers will include dimethyl polysiloxane polymers with optional vinyl groups replacing methyl groups on the polymer chain. The vinyl level will be about 0 to 5 mole percent with the molecular weight of the polymer typically being above one million.

Typical fillers include fume silica, precipitated silica, ground quartz, calcium carbonate and iron oxide. Other conventional enhancement additives can be present as well, such as heat stabilizer, structure control additives, process aids and pigments.

Figure 2:
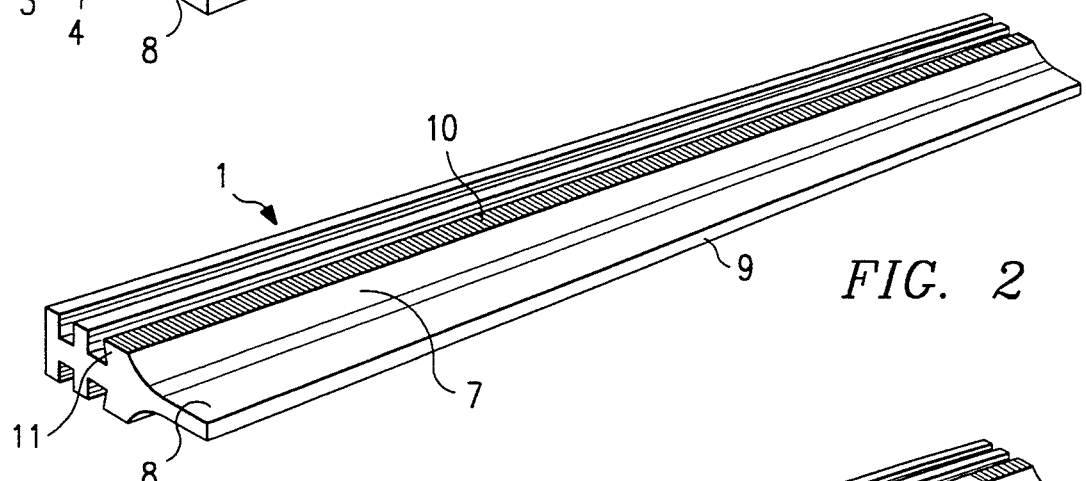
FIG. 2 is a perspective view of the present invention showing a wiper blade element with an indicator strip painted in a continuous line in accordance with the invention along the longitudinal face of the lower base portion of the wiper blade.

FIG. 2 is a perspective view of the wiper blade element 1 as shown in FIG. 1 with the indicator strip 10 painted in a continuous line along the longitudinal face of the lower base portion 11 of the wiper blade element 1. The indicator strip 10 is a silicone resin paint of the type sometimes referred to as aluminum reflector paint. The pigment which forms the active component and which undergoes the irreversible change in visible characteristic is substituted for the aluminum component of this paint. Examples of pigments which can be used include C.I. Pigment Yellow 14 (dichlorobenzidine coupled with acetoacet-o-toluidide, S.G.=1.5), C. I. Pigment Red 48:3 (strontium salt of the coupling of "2B" acid with beta-oxynaphthoic acid, S.G.=1.97), C. I. Pigment Red 53:1 (barium salt of the coupling of o-amino-m-chloro-p-toluenesulfonic acid with beta-naphthol, S. G.=2.11). These pigments are commercially available from Engelhard Corporation, Solon, OH. The invention is not limited to just these pigments. An appropriate pigment may be determined by the means of the pigment's light-fastness. The amount of pigment mixed into the resin paint determines how much exposure the paint can endure before it changes color, indicating that the wiper blade 1 needs to be replaced. A typical example of the composition of the silicone resin paint would be as follows:

1 gallon SR125 (General Electric Silicone)
1 gallon xylene
10 grams catalyst (Zinc Octate)
350 grams pigment The amount of pigment actually used will depend upon the length of exposure the paint can be subject to before it changes. The period it takes for the paint to change would correspond to the life of the wiper blade. This is determined by testing the paint with a weatherometer where the paint is exposed to ultraviolet light. The paint is applied to the lower base portion 11 of the wiper blade 1 so that it remains visible to the user of the wiper blade element 1. This also keeps the paint off the blade portion 7, 8 where it would be subjected to greater mechanical stresses which might cause the paint to flake off or peel.

Figure 3:
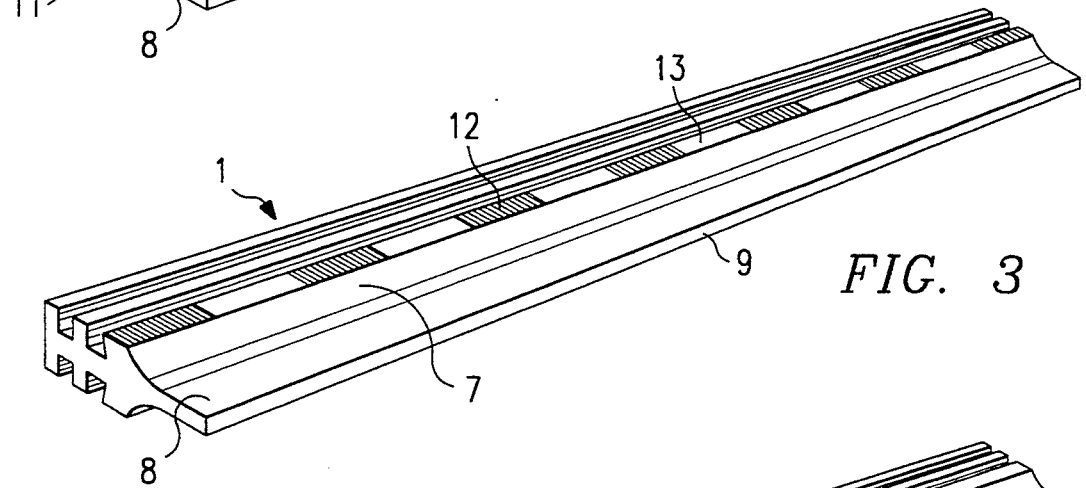
FIG. 3 is a perspective view of the present invention showing a wiper blade element with an alternate embodiment of the invention where the indicator means is applied in non-continuous areas along the longitudinal face of the lower base portion of the wiper blade.

FIG. 3 is a perspective view of the present invention showing a wiper blade element 1 with the indicator means applied in non-continuous areas along the longitudinal face of the wiper blade 1. Portions of the wiper blade are painted with the indicator paint 12 interspaced with bare portions 13. This is an alternative to applying the indicator paint in a continuous fashion as in FIG. 2. The indicator paint being the same as described above.

Figure 4:
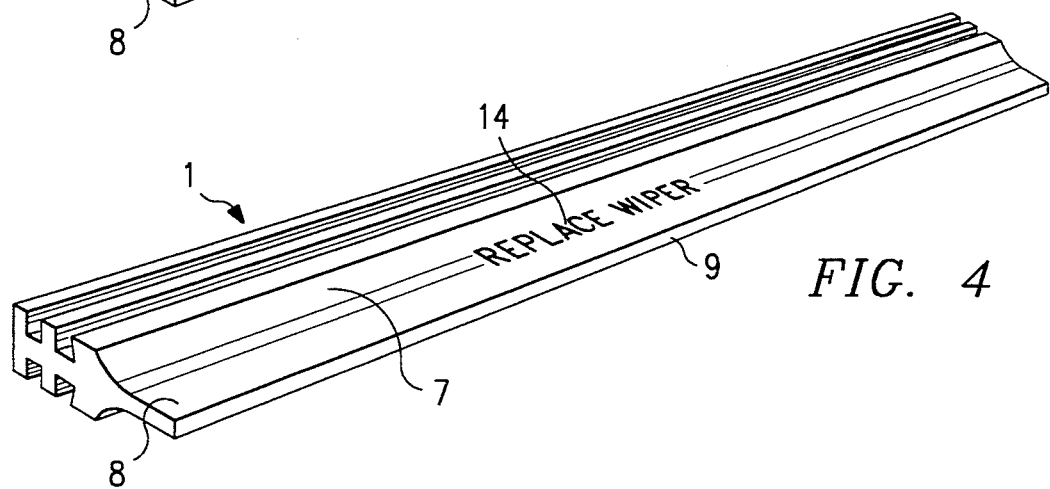
FIG. 4 is a perspective view of the present invention showing another embodiment of the invention where the indicator means is applied as alphanumeric characters to the wiper blade.

FIG. 4 shows the indicator means applied to the wiper blade as alphanumeric characters. Here the indicator means is painted on the wiper blade portions 7 and 8 to provide more surface area for the printed letters 14. The printed letters 14 spell out a message to the user that it is time to replace the wiper blade 1 upon exposure for a sufficient length of time to ultraviolet radiation.

Although the invention has been described in terms of painting an indicator strip or alphanumeric characters with the indicator paint, it will also be understood that the indicator paint could be applied as the background for the visual evidence of exposure. For instance, a dark pigment could be applied as a background for dark alphanumeric characters. Upon sufficient exposure to ultraviolet light, the background would lighten, thus irreversibly displaying the alphanumeric message.

An invention has been provided with several advantages. The present means of indication, as applied to the wiper blade element, give the user an easily visible means for determining when the wiper blade should be replaced. The indication means is inexpensive and easily applied. By alerting the user to the need to perform routine maintenance to the wiper, inconvenience and possible traffic accidents can be more readily avoided.

While the invention has been shown in only one of its forms, it is not thus limited but is susceptible to various changes and modifications without departing from the spirit thereof.

What is claimed is:

1. An improved wiper blade of the type used on a vehicle windshield, comprising:

an elongate body formed of a resilient, elastomeric material, said elongate body having opposing longitudinally extending faces which terminate in opposing ends, said elongate body having a relatively heavy backing portion which tapers outwardly to a relatively thin, longitudinally extending wiping edge;

indicator means located on at least one of said opposing longitudinally extending faces for displaying visual evidence of exposure of said blade to ultraviolet light rays over time, whereby said visual evidence provides an indication of the life expectancy of said wiper blade.

2. The improved wiper blade of claim 1, wherein said indicator means is a coating strip which extends in a continuous line on at least one of said longitudinally extending faces of said elongate body.

3. The improved wiper blade of claim 2, wherein said coating strip is comprised of a silicone resin paint having as an active component a pigment which is sensitive to ultraviolet radiation.

4. The improved wiper blade of claim 1, wherein said indicator means is a coating applied in non-continuous locations to at least one of said longitudinally extending faces of said elongate body.

5. The improved wiper blade of claim 4, wherein said coating is applied in a pattern of alphanumeric characters which forms an intelligible message regarding the life expectancy of said wiper blade, said pattern of characters being initially unobservable and being irreversibly displayed upon exposure of said blade to light rays in the atmosphere over time.

6. An improved wiper blade of the type used on a vehicle windshield, comprising:

an elongate body formed of organic rubber, said elongate body having opposing longitudinally extending faces which terminate in opposing ends, said elongate body having a relatively heavy backing portion which provides a generally triangular cross-sectional profile for said body and which tapers outwardly to a relatively thin, longitudinally extending wiping edge;

an indicator strip painted on at least one of said opposing longitudinally extending faces, said strip being comprised of a silicone resin paint having as an active component a paint pigment which is sensitive to exposure to ultraviolet radiation for displaying visual evidence of exposure of said blade to light rays over time, said painted strip being gradually converted with time from an initial state in which said visual evidence is unobservable to an aged state in which said visual evidence is observable, whereby said visual evidence provides an indication of the life expectancy of said wiper blade.

7. The improved wiper blade of claim 6, wherein said indicator means is a painted strip which extends in a continuous line on at least one of said longitudinally extending faces of said elongate body for substantially the entire length of said longitudinally extending face.

8. The improved wiper blade of claim 6, wherein said indicator means is a coating applied in non-continuous locations to at least one of said longitudinally extending faces of said elongate body, said coating forming a pattern of alphanumeric information.

9. A wiper, comprising:
an elongate blade of elastomeric material for use in an environment including a source of ultraviolet radiation, and having a finite useful life; and
a marker joined to said blade, said marker including a pigment which is sensitive to ultraviolet radiation, said marker changing color after exposure to a predetermined amount of ultraviolet radiation, such that said marker gives visual evidence of whether said blade needs to be replaced.

10. The wiper of claim 9, wherein said marker is affixed directly to said blade.

11. The wiper of claim 9, wherein said marker comprises a coating of paint containing said pigment.

12. The wiper of claim 11, wherein said paint includes a silicone resin.

13. The wiper of claim 9, wherein said pigment includes a component selected from the group consisting of C. I. Pigment yellow 14, C. I. Pigment Red 48:3, and C. I. Pigment Red 53:1.

14. A wiper for use on vehicles, comprising:
a body of elastomeric material having an exterior surface; and
a coating on at least a portion of said exterior surface, a pigment forming a portion of said coating, said pigment changing color upon exposure to a predetermined amount of ultraviolet radiation, such that said coating gives visual evidence of whether said blade needs to be replaced.

15. The wiper of claim 14, wherein said exterior surface includes at least one wiping edge operable to contact a surface to be wiped and a remainder of said surface, said coating placed on at least a portion of said remainder of said surface.

16. The wiper of claim 14, wherein said body includes a base portion and a blade portion integrally formed with said base portion, said blade portion undergoing more flexure than said base portion while in use, said marker affixed to said base portion.

* * * * *

UNITED STATES PATENT AND TRADEMARK OFFICE
CERTIFICATE OF CORRECTION

PATENT NO. : 5,349,718
DATED : September 27, 1994
INVENTOR(S) : Robert M. Gibbon It is certified that error appears in the above-indentified patent and that said Letters Patent is hereby corrected as shown below:

Col. 2, line 52, delete "polarmet" and insert "polymer".

Signed and Sealed this

Twenty-fourth Day of January, 1995

Attest:

BRUCE LEHMAN

Attesting Officer     Commissioner of Patents and Trademarks